(12) United States Patent
Muto

(10) Patent No.: US 10,141,108 B2
(45) Date of Patent: Nov. 27, 2018

(54) APPARATUS AND METHOD FOR MANUFACTURING ELECTRONIC COMPONENT

(71) Applicant: NITTOKU ENGINEERING CO., LTD., Saitama-shi, Saitama (JP)

(72) Inventor: Kenichi Muto, Fukushima (JP)

(73) Assignee: NITTOKU ENGINEERING CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/562,067

(22) PCT Filed: Apr. 28, 2016

(86) PCT No.: PCT/JP2016/063396
§ 371 (c)(1),
(2) Date: Sep. 27, 2017

(87) PCT Pub. No.: WO2016/185897
PCT Pub. Date: Nov. 24, 2016

(65) Prior Publication Data
US 2018/0068786 A1    Mar. 8, 2018

(30) Foreign Application Priority Data

May 21, 2015   (JP) ................. 2015-103352

(51) Int. Cl.
*H01F 41/00*   (2006.01)
*H01F 41/086*  (2016.01)
*H01F 41/092*  (2016.01)
*H01F 41/071*  (2016.01)
*H02K 3/50*    (2006.01)
*H01F 41/098*  (2016.01)

(52) U.S. Cl.
CPC ........ *H01F 41/086* (2016.01); *H01F 41/071* (2016.01); *H01F 41/092* (2016.01); *H01F 41/098* (2016.01); *H02K 3/50* (2013.01)

(58) Field of Classification Search
CPC ...... H01F 41/071; H01F 41/08; H01F 41/086; H01F 41/088; H01F 41/098; H01F 41/092
See application file for complete search history.

(56) References Cited

U.S. PATENT DOCUMENTS

| | | | |
|---|---|---|---|
| 1,975,620 A | * | 10/1934 | Saul ...................... H01F 41/066 242/443.1 |
| 2005/0052819 A1 | * | 3/2005 | Pianezze ................... F23Q 3/00 361/263 |

FOREIGN PATENT DOCUMENTS

| JP | H05-3921 U | 1/1993 |
|---|---|---|
| JP | 4741415 B2 | 8/2011 |

* cited by examiner

*Primary Examiner* — Emmanuel M Marcelo
(74) *Attorney, Agent, or Firm* — Rabin & Berdo, P.C.

(57) ABSTRACT

An apparatus for manufacturing an electronic component includes a grip unit configured to grip an electronic member having a plurality of projections arranged thereon, a connected coil assembly forming unit configured to form a connected coil assembly in which a plurality of single coils are connected to one another, and a coil mounting unit configured to sequentially mount the plurality of single coils of the connected coil assembly on the plurality of projections.

5 Claims, 13 Drawing Sheets

APPARATUS AND METHOD FOR MANUFACTURING ELECTRONIC COMPONENT

TECHNICAL FIELD

The present invention relates to an apparatus and a method for manufacturing an electronic component including single coils that are mounted on respective projections.

BACKGROUND ART

Conventionally, a magnetic resolver includes a rotatable rotor core and two stator plates that sandwich the rotor core in an up-down direction. Each stator plate includes a base plate, projections that bulge outward and are circumferentially arranged on the base plate, and coils that are wound on the respective projections arranged on the base plate. In such a magnetic resolver, the inductance of the coils changes in accordance with the angle of rotation of the rotor core; this phenomenon is used to detect the angle of rotation of the rotor core (see JP H5-3921 U).

In the stator plates of the foregoing conventional magnetic resolver, patterned film coils are used as the coils mounted on the projections. Such a magnetic resolver with the film coils can be reduced in thickness.

However, when each film coil is separately mounted on the corresponding projection, the film coils face the problem that they are poorly affixed. In addition, when the film coils are used, the number of turns in each coil cannot be increased and improvement in the resolver property is difficult compared with a resolver configured by winding a wire onto the projections.

In order to improve the resolver property, it is preferable to wind a wire onto the projections, rather than to use the film coils. The applicant of the present invention has proposed a technique to manufacture successive coils that can be used as a wound wire (see JP 4741415 B2). This technique manufactures a connected coil assembly that is composed of a plurality of single coils connected to one another using one continuous wire. It is presumed that the resolver property can be improved by sequentially fitting the single coils composing the obtained connected coil assembly around the projections.

SUMMARY OF INVENTION

A conventional apparatus for manufacturing a connected coil assembly according to the foregoing conventional technique merely manufactures a plurality of coils connected to one another. The coils composing the obtained connected coil assembly are separately fit in one-to-one correspondence around a plurality of projections arranged on a base plate through manual labor by workers. Manual labor causes variations in products, and raises the unit price of the obtained resolver because the labor cost is increased by a relatively small component size. This has led to a demand to fit the obtained connected coil assembly directly around the projections, which serve as receiving portions, without the help of workers.

An object of the present invention is to provide an apparatus and a method that can manufacture an electronic component including an obtained connected coil assembly in a relatively easy manner by fitting the obtained connected coil assembly directly around receiving portions.

According to one aspect of the present invention, an apparatus for manufacturing an electronic component includes a grip unit configured to grip an electronic member having a plurality of projections arranged thereon, a connected coil assembly forming unit configured to form a connected coil assembly in which a plurality of single coils are connected to one another, and a coil mounting unit configured to sequentially mount the plurality of single coils of the connected coil assembly on the plurality of projections.

According to another aspect of the present invention, a method for manufacturing an electronic component includes preparing and gripping a base plate having a plurality of projections arranged thereon, forming a connected coil assembly in which a plurality of single coils are connected to one another, and mounting the connected coil assembly on the base plate, wherein the method comprises, in mounting the connected coil assembly, sequentially mounting the plurality of single coils of the connected coil assembly on the plurality of projections while moving the base plate relative to the connected coil assembly.

DESCRIPTION OF EMBODIMENTS

Hereinafter, an embodiment of the present invention is described with reference to the accompanying drawings.

Figure 1:
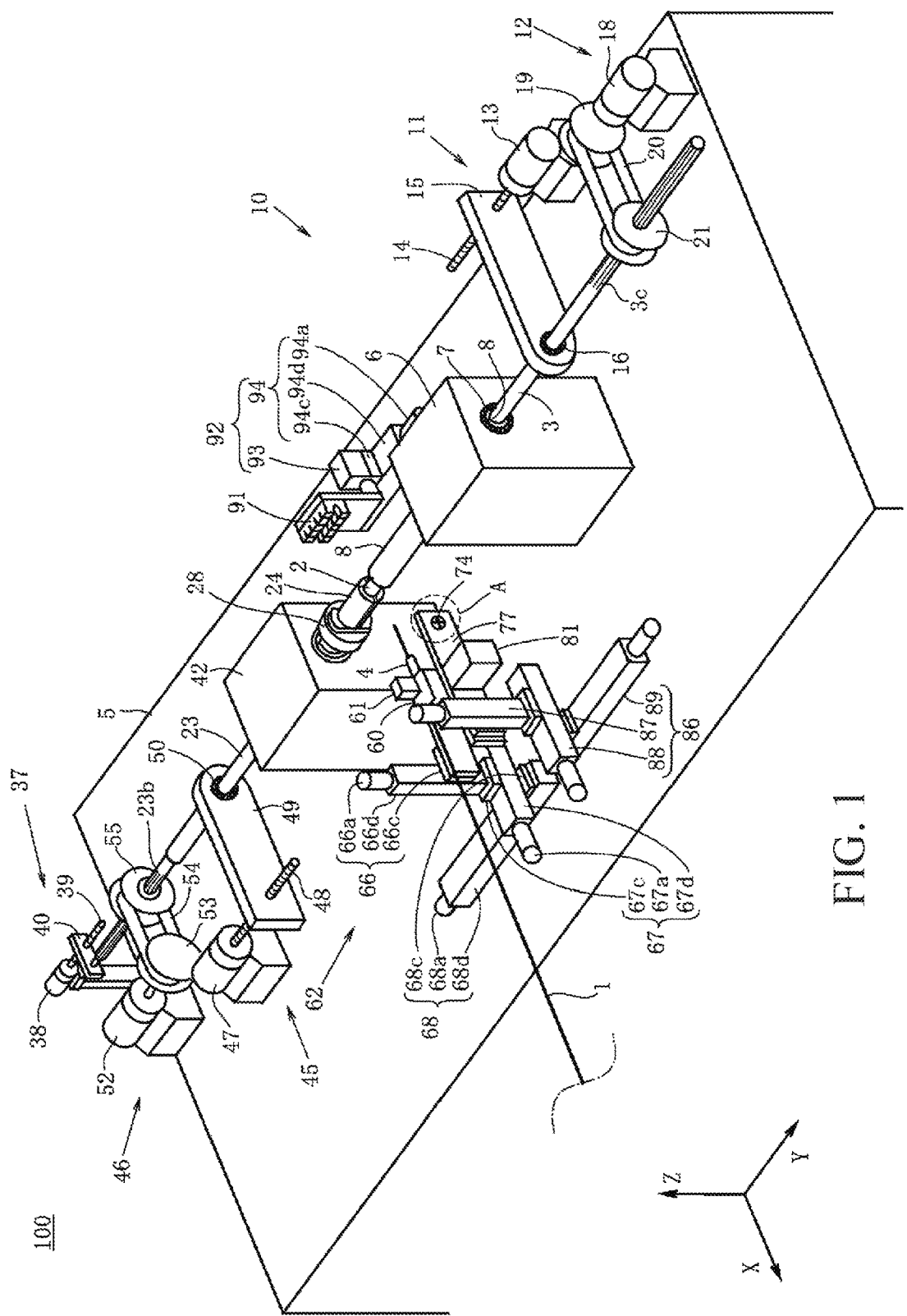
FIG. 1 is a perspective view of an apparatus for manufacturing an electronic component according to an embodiment of the present invention.

FIG. 1 is a perspective view of an apparatus 100 for manufacturing an electronic component according to the present invention. In each drawing, three axes X, Y, and Z that are perpendicular to one another are set. A description is now given of a configuration of the apparatus 100 for manufacturing the electronic component according to the present invention.

The apparatus 100 for manufacturing the electronic component according to the present invention includes a connected coil assembly forming unit 10 that forms a connected coil assembly 9 (FIG. 5) composed of a plurality of single coils 9a that are connected to one another. The connected coil assembly forming unit 10 forms the connected coil assembly 9 using one continuous wire 1. Specifically, the connected coil assembly forming unit 10 winds the wire 1 fed by a nozzle (wire supply unit) 4 onto an outer circumference of a winding shaft 2 that rotates about its axis and is movable in its axial direction.

Figure 2:
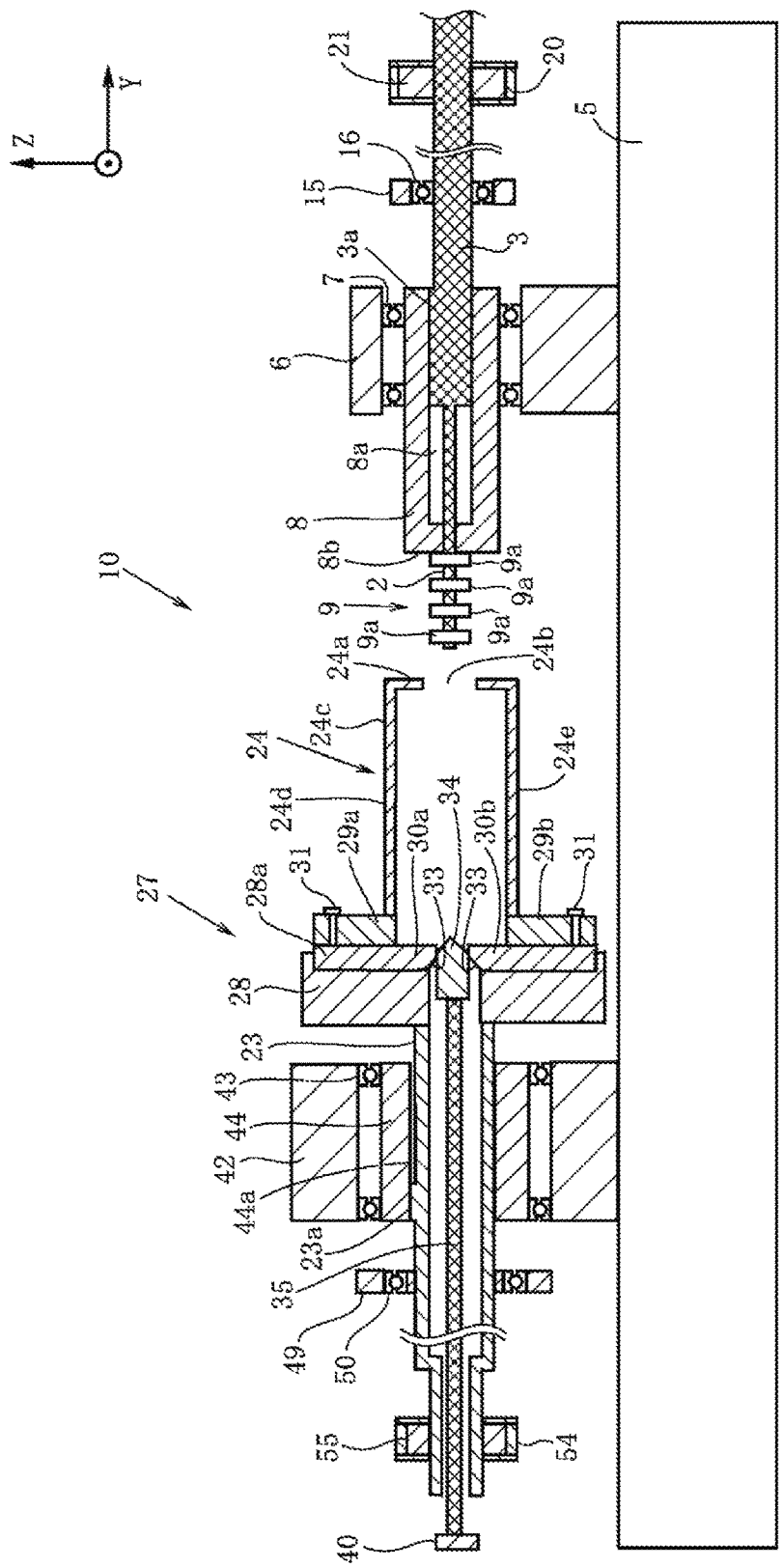
FIG. 2 is a cross-sectional view of a connected coil assembly forming unit.
Figure 3:
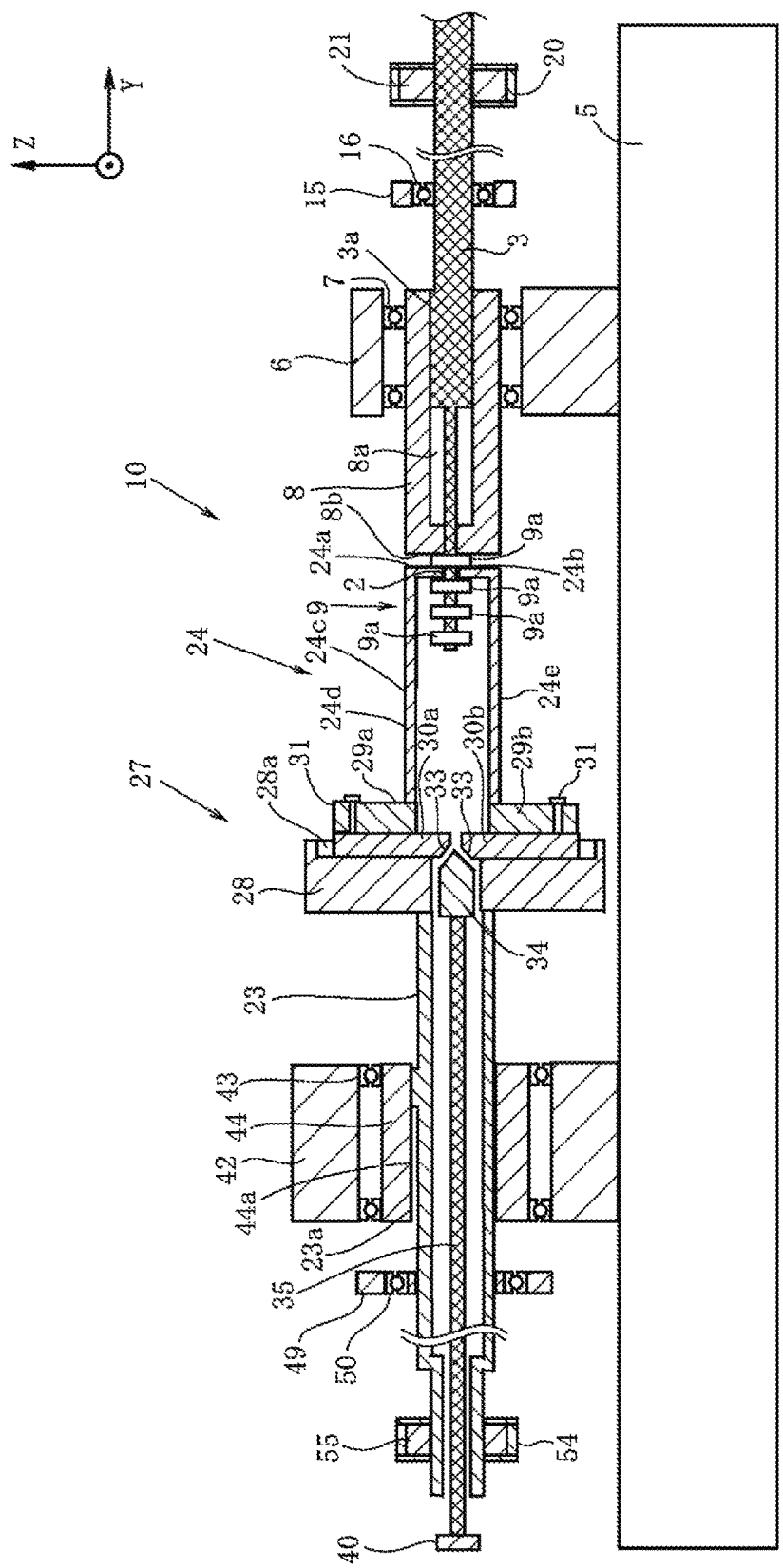
FIG. 3 is a cross-sectional view corresponding to FIG. 2, and shows a state where a plurality of single coils are stowed in a chuck.

As shown in FIGS. 1 to 3, the winding shaft 2 is attached to a distal end of a columnar shaft body 3, and is coaxial with the shaft body 3. The shaft body 3 is inserted into a tube member 8 that is rotatably supported by a mount 6, which stands on a base 5, via a bearing 7. A key 3a (FIGS. 2 and 3) is formed on an outer circumference of the shaft body 3. A keyway 8a is formed on an inner circumference of the tube member 8. Engagement between the key 3a and the keyway 8a enables the shaft body 3 to, together with the winding shaft 2, rotate integrally with the tube member 8 and slide in the axial direction relative to the tube member 8.

An outer diameter of the winding shaft 2, which is attached to the distal end of the shaft body 3 and coaxial with the shaft body 3, is equal to or slightly larger than an outer diameter of later-described projections 72 (FIG. 5) serving as receiving portions. A winding shaft moving mechanism 11 and a winding shaft rotating mechanism 12 are disposed in the vicinity of a proximal end of the shaft body 3. The winding shaft moving mechanism 11 causes the shaft body 3 to move in the axial direction together with the winding shaft 2. The winding shaft rotating mechanism 12 causes the shaft body 3 to rotate about its axis together with the winding shaft 2.

The winding shaft moving mechanism 11 includes a winding shaft moving motor 13, a ball screw 14 that is joined to an output shaft of the winding shaft moving motor 13 and extends parallel to the winding shaft 2, and a moving plate 15 that mates with the ball screw 14.

The shaft body 3 penetrates the moving plate 15 via a bearing 16. The bearing 16 enables the shaft body 3 to rotate relative to the moving plate 15, and enables the shaft body 3 and the moving plate 15 to move in the axial direction in an integrated manner.

Accordingly, driving of the winding shaft moving motor 13 causes the winding shaft 2 to move in the axial direction together with the shaft body 3 via the moving plate 15.

The winding shaft rotating mechanism 12 includes a winding shaft rotation motor 18, a first pulley 19 attached to an output shaft of the winding shaft rotation motor 18, and a second pulley 21 connected to the first pulley 19 via a belt 20.

Splines 3c are formed on an end portion of the shaft body 3. The second pulley 21 is coupled to the shaft body 3 via the splines 3c.

Accordingly, the shaft body 3, together with the winding shaft 2, rotates in synchronization with rotation of the winding shaft rotation motor 18, and slides in the axial direction relative to the second pulley 21.

A chuck shaft 23 that rotates about its axis and is movable in the axial direction is arranged coaxially with the winding shaft 2 so as to oppose the winding shaft 2. A chuck 24 that opposes the winding shaft 2 is joined to a tip of the chuck shaft 23.

The chuck 24 is a tubular member. An end surface 24a of the chuck 24 has a sliding opening 24b in which an outer circumferential surface of the winding shaft 2 slides. An inner diameter of a barrel portion 24c is larger than the outer diameter of the winding shaft 2.

In a state where the winding shaft 2 is inserted through the opening 24b into the chuck 24, the end surface 24a functions as a flange that defines an end of a single coil 9a. An end surface 8b of the tube member 8 also functions as a flange that defines an end of a single coil 9a. Therefore, the wire 1 is wound onto the winding shaft 2 in a state where the winding width is defined by the end surface 24a of the chuck 24 and the end surface 8b of the tube member 8. The chuck 24 and the tube member 8 serve as winding width defining members.

The chuck 24 is segmented into two semi-tubular chuck segments 24d, 24e extending in the axial direction. The chuck segments 24d, 24e can be opened in a direction perpendicular to the axial direction by a later-described opening mechanism 27.

When the chuck 24 is in an opened state (FIG. 2), the opening 24b of the chuck 24 has an increased opening area, and the winding shaft 2 can be inserted through the opening 24b into the chuck 24 even if one or more single coils 9a have been wound onto the winding shaft 2.

During winding onto the winding shaft 2 (FIG. 3), the chuck 24 is placed in a closed state to define an end of a single coil 9a. After winding onto the winding shaft 2, the chuck 24 is placed in the opened state (FIG. 2) and allows the winding shaft 2 to be inserted thereinto. The plurality of single coils 9a are wound onto the winding shaft 2 by moving the winding shaft 2 in the axial direction in synchronization with the operations of closing and opening the chuck 24.

Figure 4:
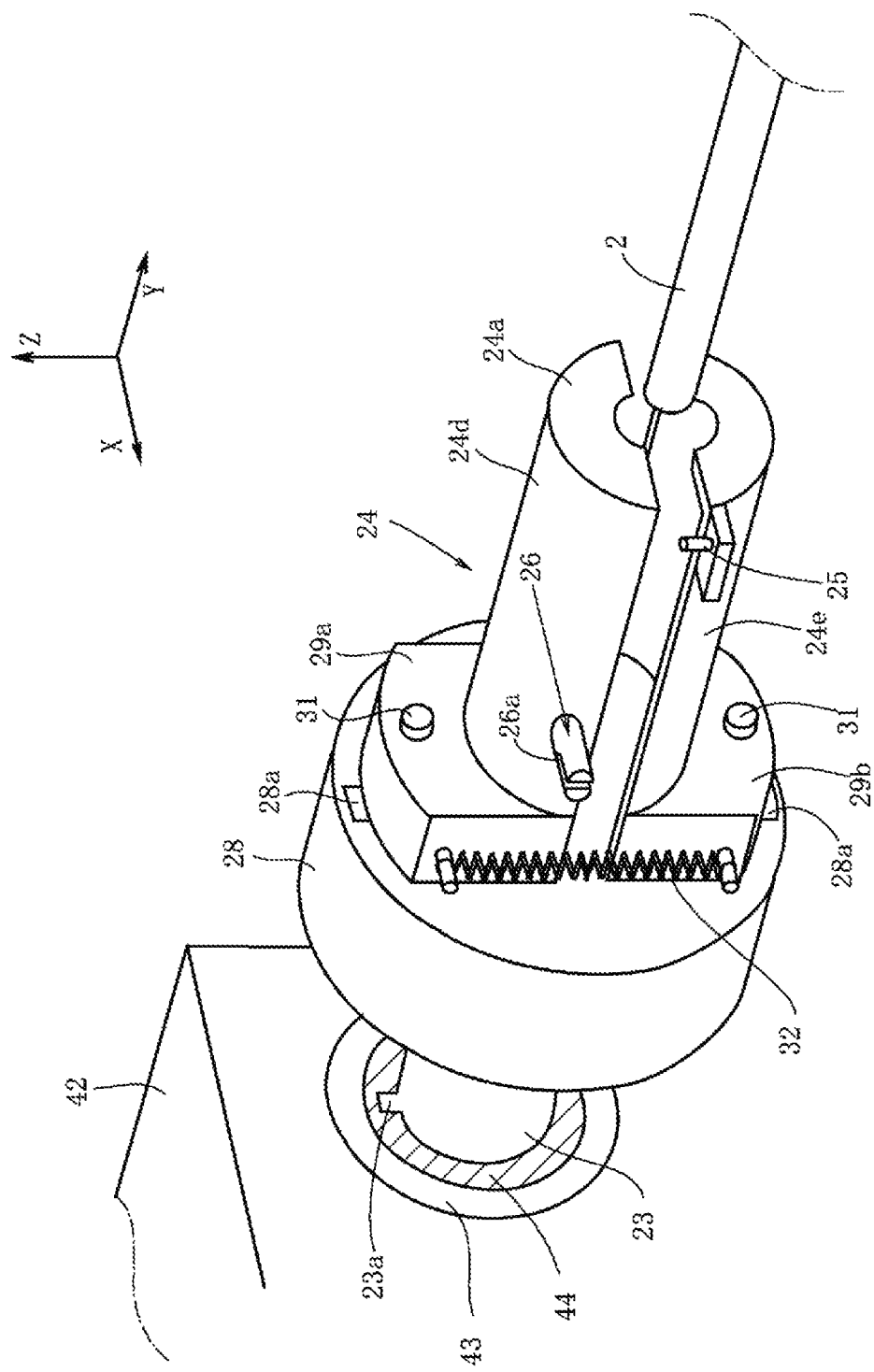
FIG. 4 is an enlarged perspective view of the vicinity of the chuck.

As shown in FIG. 4, a holding tool 26 is mounted on an outer circumference of one chuck segment 24d. A cutout 26a is formed in a tip of the holding tool 26. At the start of winding, the wire 1 is hooked in the cutout 26a. An outer circumference of an end portion of the other chuck segment 24e is provided with a latch pin 25 that serves as a latch member to which a connecting wire portion 9b (FIGS. 9 to 12) between neighboring single coils 9a wound onto the winding shaft 2 latches.

A description is now given of the opening mechanism 27 that opens the chuck 24. As shown in FIGS. 2 to 4, a disc member 28 is joined to the tip of the chuck shaft 23. A guiding groove 28a extending in a direction perpendicular to the winding shaft 2 is formed on an end surface of the disc member 28.

Flanges 29a, 29b are respectively formed at ends of the chuck segments 24d, 24e opposite to the end surface 24a. Plate members 30a, 30b that slidably fit in the guiding groove 28a are respectively joined to back surfaces of the flanges 29a, 29b by screws 31. A spring 32 (FIG. 4) applies a force to the flanges 29a, 29b in a direction of closing the chuck segments 24d, 24e.

As shown in FIGS. 2 and 3, a central bar 35 that is movable in the axial direction is inserted through a hollow portion of the chuck shaft 23. A wedge 34 having a tapered shape is joined to a tip of the central bar 35. Each of the plate members 30a, 30b has a tapered portion 33 that conforms to the tapered shape of the wedge 34. As shown in FIG. 2, when the central bar 35 advances, the wedge 34 comes into contact with and presses the tapered portions 33 of the plate members 30a, 30b, thereby causing the plate members 30a, 30b to move away from each other along the guiding groove 28a of the disc member 28.

As a result, the chuck segments 24d, 24e move away from each other against the force applied by the spring 32, and the chuck 24 opens in the direction perpendicular to the winding shaft 2. As shown in FIG. 3, when the central bar 35 recedes, the wedge 34 moves away from the plate members 30a, 30b, thereby causing the chuck 24 to close under the force applied by the spring 32. Therefore, the chuck 24 opens and closes as the central bar 35 advances and recedes.

As shown in FIG. 1, the connected coil assembly forming unit 10 includes a central bar moving mechanism 37 that causes the central bar 35 to advance and recede. The central bar moving mechanism 37 includes a central bar moving motor 38, a ball screw 39 joined to an output shaft of the central bar moving motor 38, and a moving plate 40 that mates with the ball screw 39. The ball screw 39 extends parallel to the central bar 35. The moving plate 40 is fixed to the central bar 35. Driving of the central bar moving motor 38 causes the central bar 35 to move in the axial direction via the moving plate 40.

As shown in FIGS. 1 to 4, the chuck shaft 23 is inserted through a tube 44 that is rotatably supported by a mount 42, which stands on the base 5, via a bearing 43. A key 23a is formed on an outer circumference of the chuck shaft 23. A keyway 44a is formed on an inner circumference of the tube 44. Engagement between the key 23a and the keyway 44a enables the chuck shaft 23 to rotate integrally with the tube 44 and slide in the axial direction relative to the tube 44.

As shown in FIG. 1, the connected coil assembly forming unit 10 includes a chuck shaft moving mechanism 45 that moves the chuck shaft 23 in the axial direction, and a chuck shaft rotating mechanism 46 that rotates the chuck shaft 23. The chuck shaft moving mechanism 45 includes a chuck shaft moving motor 47, a ball screw 48 joined to an output shaft of the chuck shaft moving motor 47, and a moving plate 49 that mates with the ball screw 48. The ball screw 48 extends parallel to the chuck shaft 23.

The chuck shaft 23 penetrates the moving plate 49 via a bearing 50. The bearing 50 enables the chuck shaft 23 to rotate relative to the moving plate 49, and enables the chuck shaft 23 and the moving plate 49 to move in the axial direction in an integrated manner.

Accordingly, driving of the chuck shaft moving motor 47 causes the chuck shaft 23 to move in the axial direction via the moving plate 49.

The chuck shaft rotating mechanism 46 includes a chuck shaft rotation motor 52, a first pulley 53 attached to an output shaft of the chuck shaft rotation motor 52, and a second pulley 55 connected to the first pulley 53 via a belt 54.

Splines 23b are formed on an end portion of the chuck shaft 23. The second pulley 55 is coupled to the chuck shaft 23 via the splines 23b.

Accordingly, the chuck shaft 23 rotates in synchronization with rotation of the chuck shaft rotation motor 52, and slides in the axial direction relative to the second pulley 55.

As described above, the chuck shaft 23 rotates about its axis, and is movable in the axial direction. The chuck shaft rotating mechanism 46 and the chuck shaft moving mechanism 45 cause the chuck 24 to rotate and move in the axial direction via the chuck shaft 23.

The nozzle 4 feeds the wire 1 supplied from a wire supply source (not shown) toward the winding shaft 2. The nozzle 4 is held by a nozzle holding member 60. The wire 1 is a so-called thermal fusion wire whose surface has a coating that can be fused by heat. The wire 1 is inserted through a through hole of the nozzle holding member 60 and the nozzle 4 to be guided to the winding shaft 2.

The nozzle holding member 60 has a clamp cylinder 61. Driving of the clamp cylinder 61 causes a piston (not shown) to press the wire 1 against the nozzle holding member 60; as a result, the wire 1 is held.

A nozzle moving mechanism 62 enables the nozzle 4 to move in the directions of the three perpendicular axes together with the nozzle holding member 60. In the present embodiment, the nozzle moving mechanism 62 is composed of a set of extendable/contractible actuators 66 to 68 corresponding to the X-axis, Y-axis, and Z-axis directions. The "X-axis direction" denotes a horizontal direction perpendicular to the winding shaft 2, the "Y-axis direction" denotes the axial direction of the winding shaft 2, and the "Z-axis direction" denotes a vertical direction.

The extendable/contractible actuators 66 to 68 of the nozzle moving mechanism 62 are respectively composed of housings 66d to 68d, ball screws (not shown), and followers 66c to 68c that mate with the ball screws. Each of the housings 66d to 68d has a shape of a narrow, elongated box. Each ball screw extends in a longitudinal direction of the corresponding housing 66d, 67d, or 68d inside the corresponding housing 66d, 67d, or 68d. The ball screws are driven and rotated by servomotors 66a to 68a. Each of the followers 66c to 68c can move parallel to the longitudinal direction of the corresponding housing 66d, 67d, or 68d. In each of the extendable/contractible actuators 66 to 68, driving of the corresponding servomotor 66a, 67a, or 68a causes the corresponding ball screw to rotate. As a result, each of the followers 66c to 68c that mate with the ball screws moves in the longitudinal direction of the corresponding housing 66d, 67d, or 68d.

In the present embodiment, the nozzle holding member 60 is attached to the follower 66c of the extendable/contractible actuator 66 corresponding to the Z-axis direction. The housing 66d of the extendable/contractible actuator 66 corresponding to the Z-axis direction is attached to the follower 67c of the extendable/contractible actuator 67 corresponding to the X-axis direction. The housing 67d of the extendable/contractible actuator 67 corresponding to the X-axis direction is attached to the follower 68c of the extendable/contractible actuator 68 corresponding to the Y-axis direction. The housing 68d of the extendable/contractible actuator 68 corresponding to the Y-axis direction extends in the Y-axis direction and is fixed to the base 5. That is, the nozzle 4 moves in the Z-axis direction together with the nozzle holding member 60 along with a movement of the follower 66c of the extendable/contractible actuator 66 corresponding to the Z-axis direction. The nozzle 4 also moves in the X-axis direction together with the extendable/contractible actuator 66 corresponding to the Z-axis direction and the nozzle holding member 60 along with a movement of the follower 67c of the extendable/contractible actuator 67 corresponding to the X-axis direction. The nozzle 4 also moves in the X-axis direction together with the extendable/contractible actuator 67 corresponding to the X-axis direction, the extendable/contractible actuator 66 corresponding to the Z-axis direction, and the nozzle holding member 60 along with a movement of the follower 68c of the extendable/contractible actuator 68 corresponding to the Y-axis direction.

The servomotors 66a to 68a of the extendable/contractible actuators 66 to 68 are connected to a non-illustrated controller that controls them. The nozzle moving mechanism 62 moves the nozzle 4 in the directions of the three perpendicular axes in accordance with an instruction (control output) from this controller.

Figure 9:
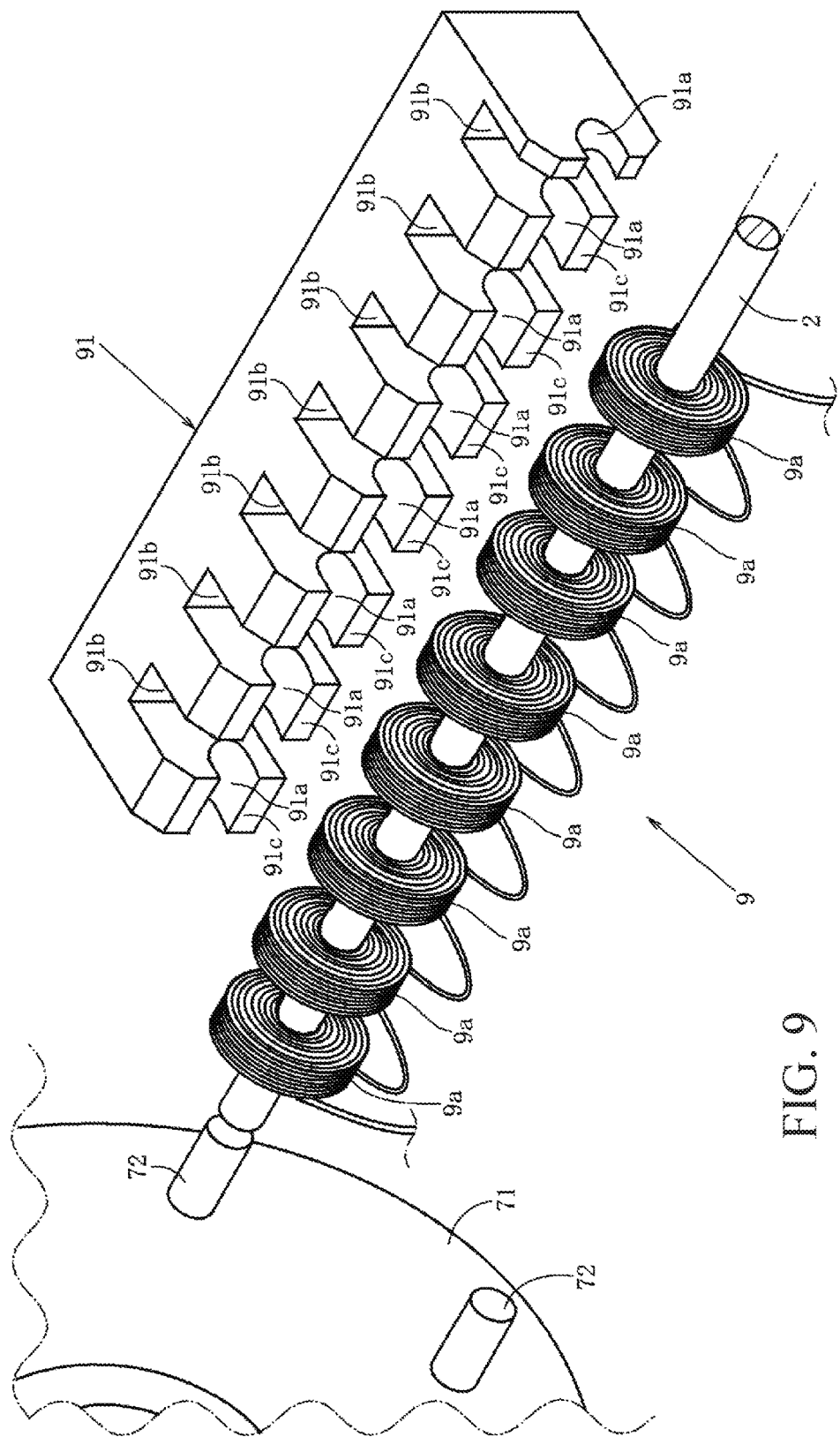
FIG. 9 is a perspective view showing a relationship between a connected coil assembly formed on a winding shaft and a coil latch.

The connected coil assembly forming unit 10 configured in the foregoing manner can form a single coil 9a by winding the wire 1 onto the winding shaft 2 between the chuck 24 and the tube member 8 as shown in FIG. 3, and then stow the obtained single coil 9a inside the chuck 24 by opening the chuck 24 shown in FIG. 2. After the single coil 9a is stowed inside the chuck 24, the chuck 24 is closed. Then, another single coil 9a can be formed by winding the wire 1 onto the winding shaft 2 between the chuck 24 and the tube member 8 again as shown in FIG. 3. Repeating such formation of a single coil 9a makes it possible to obtain the connected coil assembly 9 composed of the plurality of single coils 9a that are formed at a predetermined interval on the winding shaft 2 as shown in FIG. 9.

The apparatus 100 for manufacturing the electronic component also includes a grip unit that grips a constituent of the electronic component. In the present embodiment, the electronic component is a magnetic resolver, and the constituent of the electronic component is a stator plate of the magnetic resolver.

Figure 5:
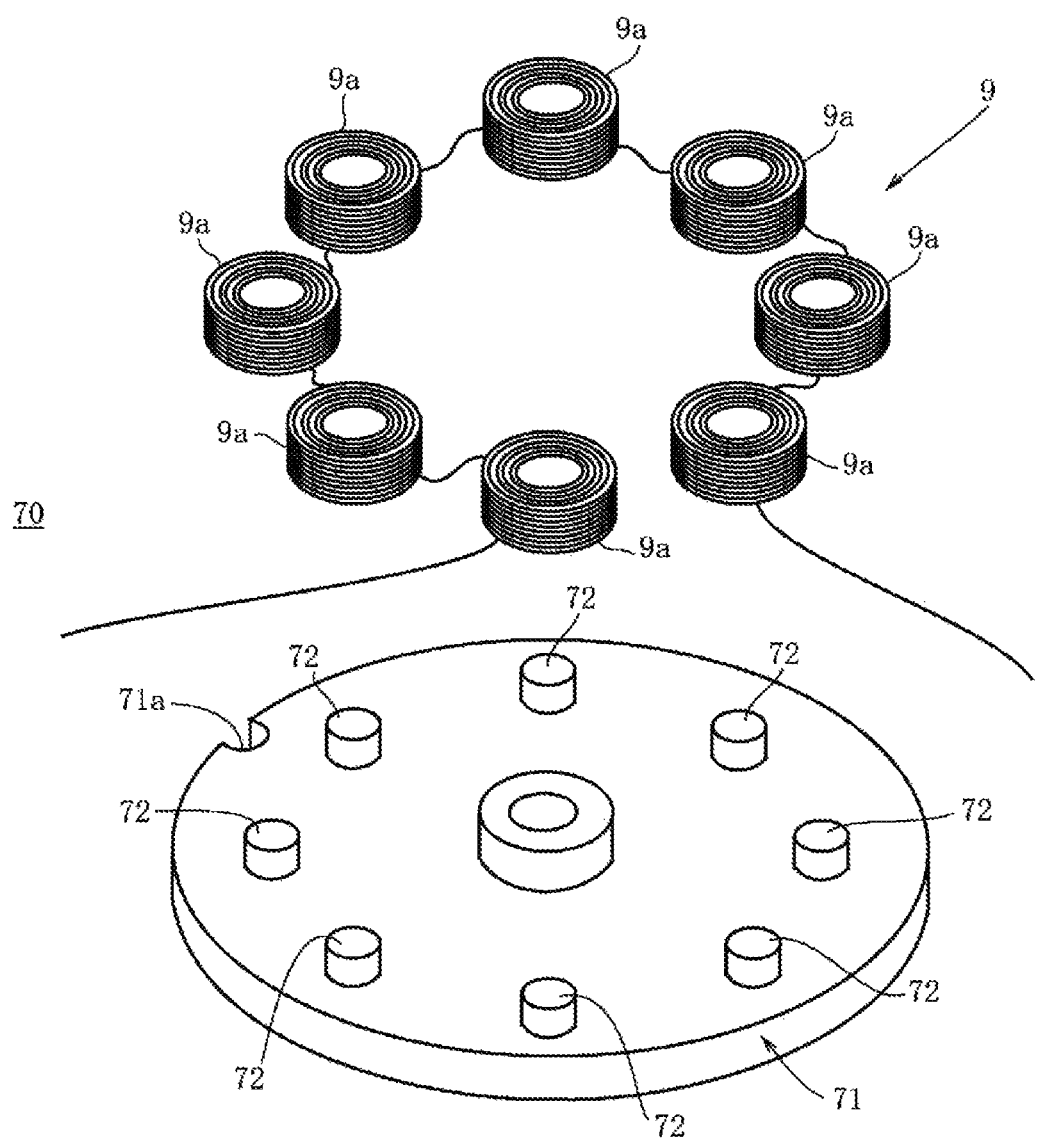
FIG. 5 is an exploded perspective view of a stator plate of an electronic component according to the embodiment.

The magnetic resolver is composed of a rotatable rotor core and two stator plates that sandwich the rotor core in an up-down direction. As shown in FIG. 5, a stator plate 70 includes an annular base plate (electronic member) 71, the projections 72 that are circumferentially arranged on one surface of the base plate 71, and the single coils 9a that are each wound on the corresponding projection 72 arranged on the base plate 71. The projections 72 bulge outward. In the magnetic resolver having such a stator plate 70, the inductance of the single coils 9a changes in accordance with the angle of rotation of the non-illustrated rotor core; this phenomenon is used to detect the angle of rotation of the rotor core.

The base plate 71 of the stator plate 70 is made of a ferrous magnetic material. The projections 72 formed on the base plate 71 are made of a ferrous magnetic material (e.g., ferrosilicon), similarly to the base plate 71. The projections 72 may be formed integrally with the base plate 71 by, for example, machine processing or etching, or may be formed by placing columnar laminates configured as discrete bodies on the base plate 71.

In the present embodiment, all projections 72 have the same circular, or columnar, shape. The projections 72 are regularly and circumferentially arranged on the annular base plate 71. That is, the centers of the projections 72 (the centers of their circular shapes) are located at a certain angular interval on a fixed-diameter circumference that is centered at a central axis of the annular base plate 71. The drawings exemplarily show eight projections 72 (eight poles) that are formed at an angular interval of 45 degrees. A positioning recess 71a is formed on an outer circumferential rim of the base plate 71.

Figure 6:
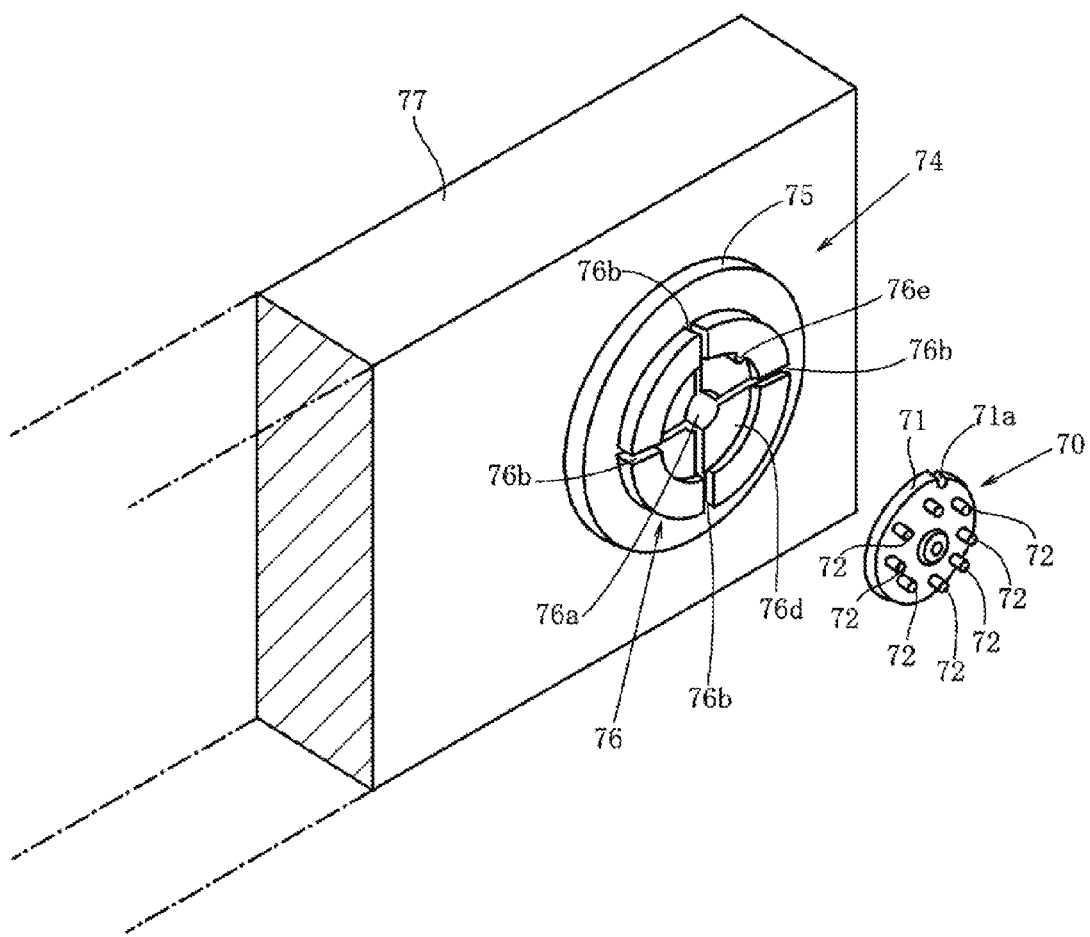
FIG. 6 is an enlarged perspective view of section A in FIG. 1.
Figure 7:
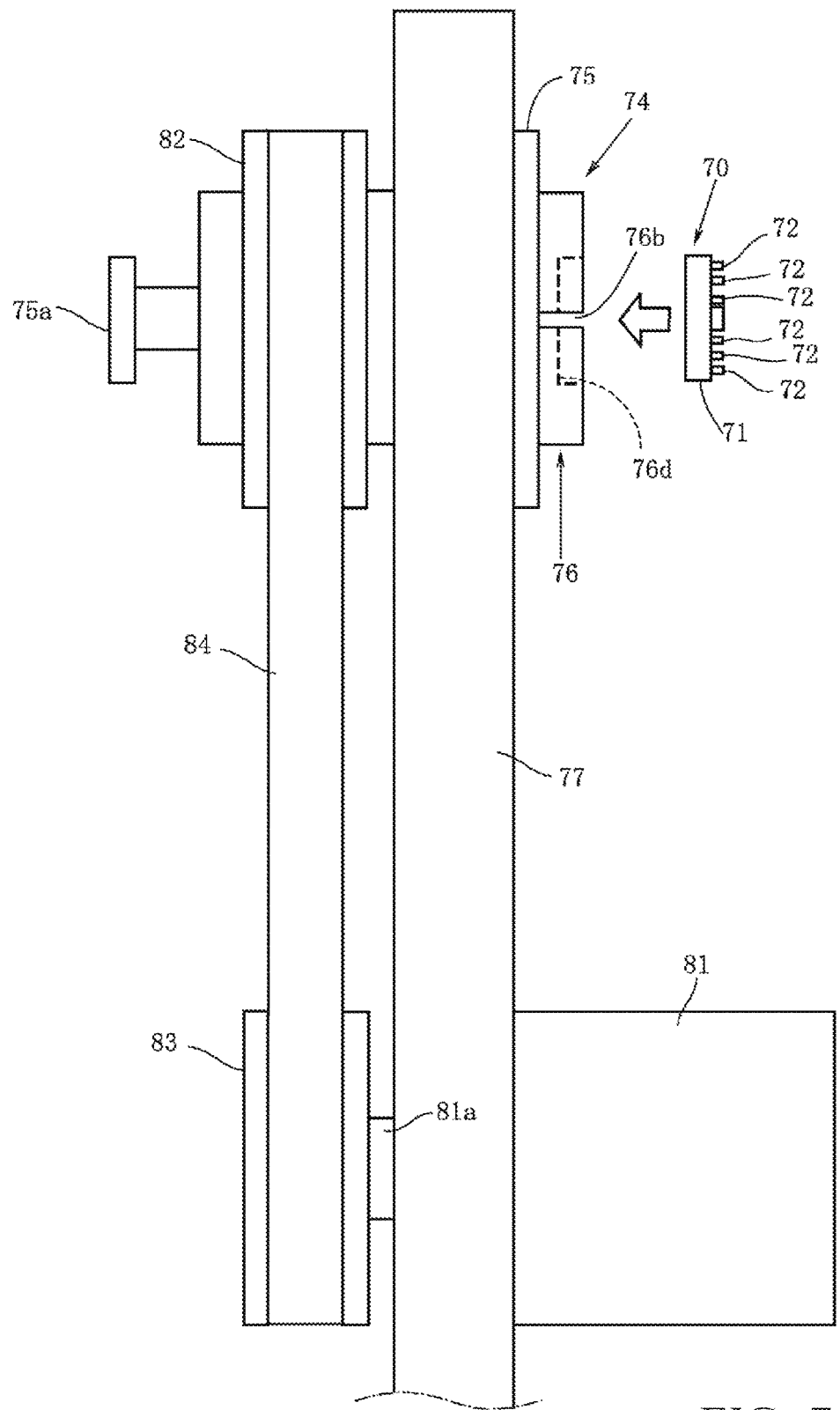
FIG. 7 is a top view of a rotating mechanism.

In the present embodiment, the grip unit that grips such a stator plate 70, which is the constituent of the electronic component, is a collet chuck 74 that grips a circumference of the stator plate 70 as shown in FIGS. 6 and 7. The collet chuck 74 includes a tube member 75 and a chuck body 76 that is fit in the tube member 75 by insertion so as to be coaxial with the tube member 75. The tube member 75 is disposed in such a manner that its central axis is parallel to the winding shaft 2 (see FIG. 1).

The chuck body 76 has a hole 76a that is formed from a distal end of the chuck body 76 to extend along a central axis of the chuck body 76, and four slits 76b that extend radially from the hole 76a (FIG. 6). Each slit 76b also extends in the axial direction from the edge of the distal end of the chuck body 76. The distal end of the chuck body 76 is circumferentially divided into four by the four slits 76b. A recess 76d that houses the stator plate 70 is formed at the distal end of the chuck body 76. The recess 76d and the hole 76a share the same central axis. A circumferential wall of the recess 76d is formed in conformity with the outer shape of the stator plate 70. A projection 76e that is inserted into the recess 71a of the base plate 71 is formed on a part of the circumferential wall of the recess 76d (FIG. 6).

The chuck body 76 is fit in the tube member 75 while being elastically supported by a non-illustrated chuck spring in the axial direction. Although not illustrated, each segment of the chuck body 76 has a portion that is inserted into the tube member 75. An outer circumference of this portion has a tapered surface that decreases in outer diameter with decreasing distance to a proximal end of the segment. An inner circumference of the tube member 75 comes into sliding contact with the tapered surface of each segment of the chuck body 76.

The non-illustrated chuck spring, which is housed in the tube member 75, applies a force to the chuck body 76 so as to move the chuck body 76 in the axial direction relative to the tube member 75. The tapered surfaces of the chuck body 76 are pressed in the same direction. Accordingly, the interval between distal ends of the segments of the chuck body 76, which are separated by the slits 76b, is reduced. Thus, the chuck body 76 grips a circumference of the base plate 71 housed in the recess 76d formed at the distal end of the chuck body 76. That is, the collet chuck 74 can grip the base plate 71 in a state where they share the same central axis.

As shown in FIG. 7, the tube member 75 of the collet chuck 74 is supported by a movable plate 77 in a manner rotatable about its central axis. Therefore, the collet chuck 74 is mounted on the movable plate 77 in a manner rotatable about a central axis of the stator plate 70 while the circumference of the stator plate 70 is being gripped by the collet chuck 74.

An operation member 75a is disposed at the proximal end side of the collet chuck 74 that penetrates the movable plate 77. The operation member 75a moves the chuck body 76 in a reverse direction against the force applied by the non-illustrated chuck spring. Pressing the operation member 75a increases the interval between the distal ends of the segments of the chuck body 76, which are separated by the slits 76b, thereby releasing the grip on the base plate 71 housed in the recess 76d formed at the distal end of the chuck body 76. That is, the collet chuck 74 enables removal of the base plate 71 from the recess 76d.

The apparatus 100 for manufacturing the electronic component according to the present invention includes a rotating mechanism 81 that causes the collet chuck 74 to rotate about the central axis of the stator plate 70 relative to the movable plate 77 together with the stator plate 70, and a chuck moving mechanism 86 that causes the movable plate 77 to move in the directions of the three perpendicular axes together with the rotating mechanism 81 (FIG. 1).

Specifically, as shown in FIG. 7, a chuck-side pulley 82 is disposed at the proximal end side of the tube member 75 that penetrates the movable plate 77. The rotating mechanism 81 is constituted by a servomotor and attached to the movable plate 77. A motor-side pulley 83 is mounted on a rotation shaft 81a of the servomotor 81. A belt 84 is suspended on the chuck-side pulley 82 and the motor-side pulley 83. Driving of the servomotor 81 causes the motor-side pulley 83 to rotate. This causes the chuck-side pulley 82 to rotate together with the collet chuck 74 via the belt 84. As such, the rotating mechanism 81 causes the stator plate 70 gripped by the collet chuck 74 to rotate about the central axis of the stator plate 70.

As shown in FIG. 1, the chuck moving mechanism 86 is composed of a set of extendable/contractible actuators 87 to 89 corresponding to the X-axis, Y-axis, and Z-axis directions. The extendable/contractible actuators 87 to 89 corresponding to the X-axis, Y-axis, and Z-axis directions cause the movable plate 77 to move in the directions of the three perpendicular axes together with the rotating mechanism 81. In the present embodiment, the chuck moving mechanism 86, which is composed of the extendable/contractible actuators 87 to 89 corresponding to the X-axis, Y-axis, and Z-axis directions, is configured in the same manner as the aforementioned nozzle moving mechanism 62. Therefore, a description of the chuck moving mechanism 86 will be redundant, and hence omitted.

The apparatus 100 for manufacturing the electronic component according to the present invention also includes a coil mounting unit that mounts, on a projection(s) 72 of the stator plate 70, at least one of the successive single coils 9a composing the connected coil assembly 9 that is formed on the winding shaft 2 by the connected coil assembly forming unit 10.

As shown in FIG. 1, the coil mounting unit according to the present embodiment includes a coil latch 91 and a jig moving unit 92 that moves the coil latch 91. The jig moving unit 92 makes the coil latch 91 latch to the connected coil assembly 9 by moving the coil latch 91 toward the winding shaft 2, and also moves the coil latch 91 in the axial direction of the winding shaft 2 to sequentially remove the single coils 9a composing the connected coil assembly 9 from the winding shaft 2.

Figure 10:
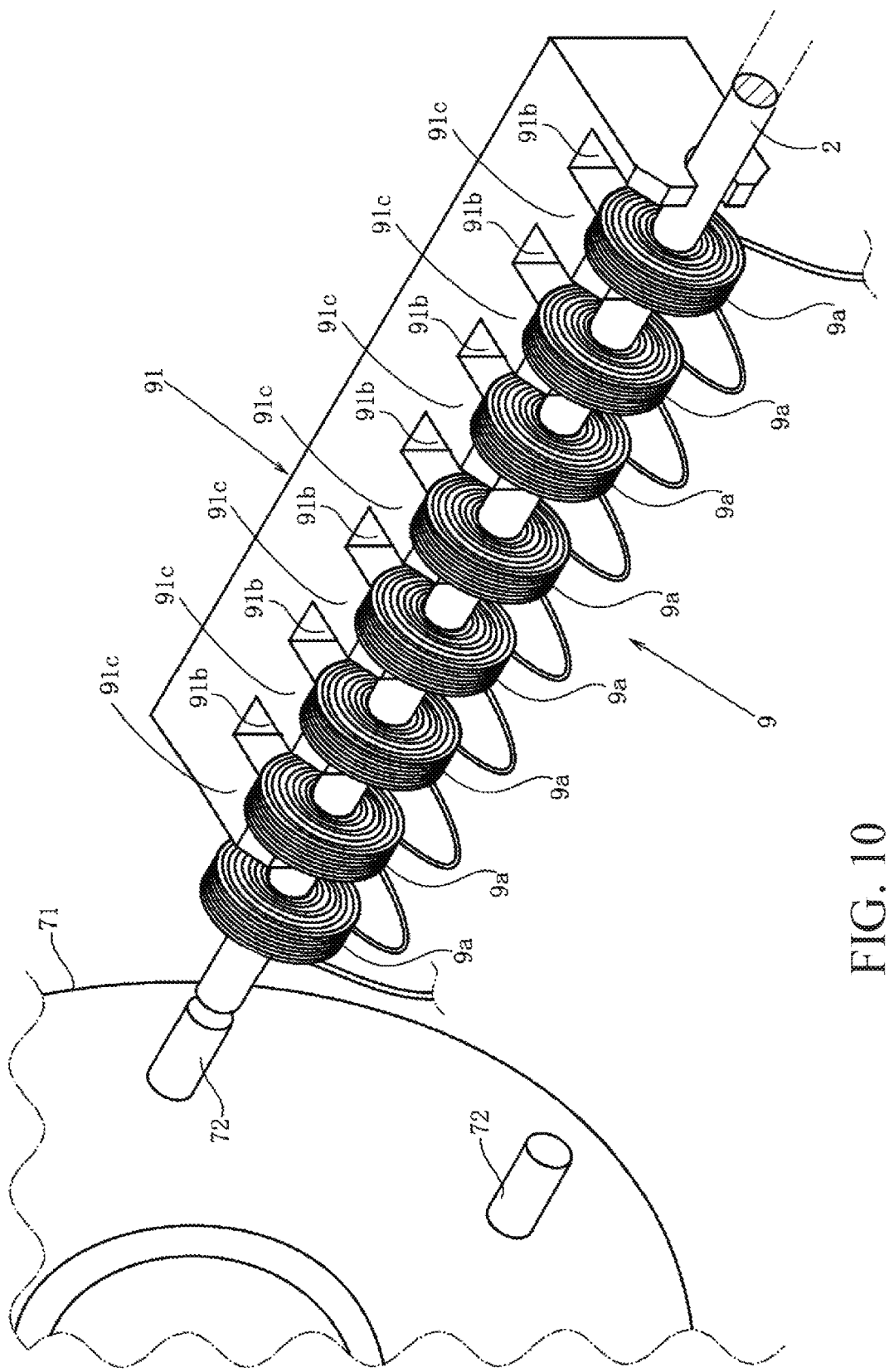
FIG. 10 is a perspective view corresponding to FIG. 9, and shows a state where the coil latch has latched to the connected coil assembly.

As shown in FIG. 9, the coil latch 91 includes housing grooves 91a that house the winding shaft 2 inserted through the formed connected coil assembly 9, and housing portions 91b that house the single coils 9a formed at a predetermined interval on the winding shaft 2. A plurality of pawls 91c are formed in such a manner that the pawls 91c and the housing portions 91b alternate. Each pawl 91c is to be inserted between neighboring single coils 9a. As shown in FIG. 10, the coil latch 91 can latch to the connected coil assembly 9 composed of the single coils 9a that are connected to one another at a predetermined interval on the winding shaft 2.

As shown in FIG. 1, the jig moving unit 92 includes a bidirectional fluid pressure cylinder 93 that causes the coil latch 91 to move toward and away from the winding shaft 2, and an axial movement actuator 94 that causes the bidirectional fluid pressure cylinder 93 to move in the axial direction of the winding shaft 2 together with the coil latch 91.

The axial movement actuator 94 is composed of a housing 94d, a ball screw (not shown), a follower 94c that mates with the ball screw and exerts a translational motion, and so forth. The housing 94d has a shape of a narrow, elongated box, and is mounted on the base 5 so as to be parallel to the winding shaft 2. The ball screw extends in a longitudinal direction of the housing 94d inside the housing 94d. The ball screw is driven and rotated by a servomotor 94a. In the axial movement actuator 94, driving of the servomotor 94a causes the ball screw to rotate. This causes the follower 94c, which mates with the ball screw, to move in the longitudinal direction of the housing 94d. The bidirectional fluid pressure cylinder 93 is attached to the follower 94c.

In order to remove the connected coil assembly 9 from the winding shaft 2, first of all, the bidirectional fluid pressure cylinder 93 brings the coil latch 91 into proximity with the winding shaft 2 as shown in FIG. 10. As a result, the single coils 9a composing the connected coil assembly 9 are housed in the housing portions 91b, and each pawl 91c is inserted between neighboring single coils 9a.

Figure 11:
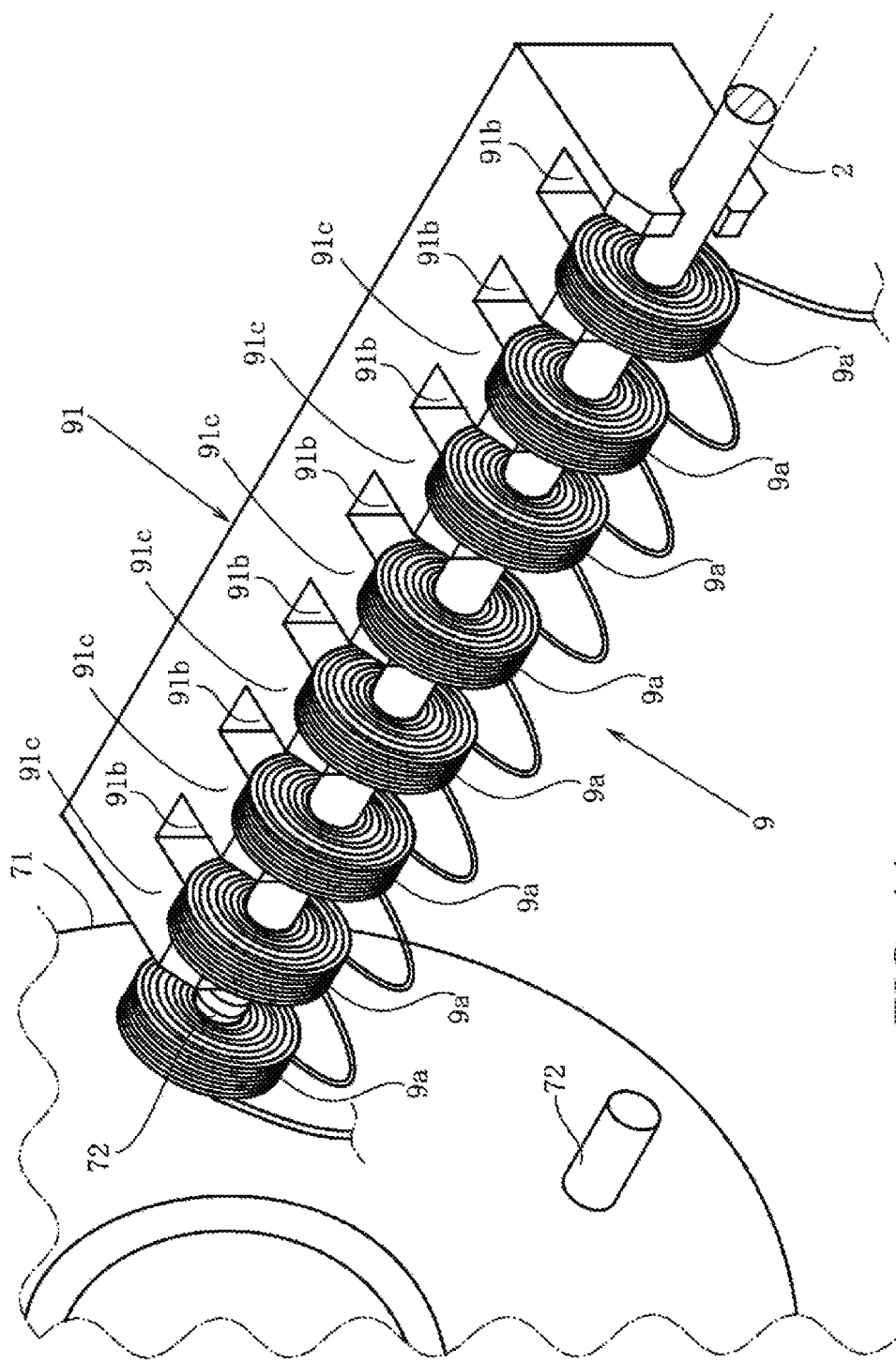
FIG. 11 is a perspective view corresponding to FIG. 10, and shows a state where the first single coil has been mounted on a projection by moving the connected coil assembly in an axial direction of the winding shaft.

Next, as shown in FIG. 11, the axial movement actuator 94 (FIG. 1) causes the bidirectional fluid pressure cylinder 93 to move in the axial direction of the winding shaft 2 together with the coil latch 91. As the pawls 91c restrict the movement of the connected coil assembly 9, the connected coil assembly 9 moves in the axial direction of the winding shaft 2 together with the coil latch 91. This initiates the removal of the connected coil assembly 9 from the winding shaft 2.

The apparatus 100 for manufacturing the electronic component includes a hot air device 96 that blows hot air (FIG. 8D), a cutter device (not shown) for cutting the wire 1, and a cutter moving mechanism (not shown) that causes the cutter device to move between a cutting position and a standby position. The hot air device 96 blows hot air to a single coil 9a while the connected coil assembly forming unit 10 is forming the single coil 9a by winding the wire 1 onto the winding shaft 2. As a result, the single coil 9a is welded. The cutter device cuts the wire 1 after the completion of winding of the wire 1 onto the winding shaft 2.

A description is now given of a method for manufacturing the electronic component using the apparatus 100 for manufacturing the electronic component. The operations of the apparatus 100 for manufacturing the electronic component are controlled by a controller (not shown) installed in the apparatus 100 for manufacturing the electronic component.

The method for manufacturing the electronic component includes a step of preparing and gripping the constituent of the electronic component, a connected coil assembly forming step of forming the connected coil assembly 9, and a coil mounting step of mounting the connected coil assembly 9 on the constituent of the electronic component. The constituent of the electronic component includes the base plate 71 and the plurality of projections 72 arranged on the base plate 71. The connected coil assembly 9 is composed of the plurality of single coils 9a that are connected to one another. In the coil mounting step, at least one of the single coils 9a of the connected coil assembly 9 is mounted on the base plate 71 using a projection(s) 72 as a central shaft(s). The method for manufacturing the electronic component is characterized by, in the coil mounting step, sequentially mounting the single coils 9a (in a wound state) of the connected coil assembly 9 on the plurality of projections 72 while moving the constituent of the electronic component relative to the connected coil assembly 9.

Below, each step will be described in detail.

<Constituent Gripping Step>

In the constituent gripping step, the constituent of the electronic component, which includes the plurality of projections 72 arranged on the base plate 71, is prepared and gripped. In the present embodiment, the electronic component is the magnetic resolver, and the constituent is the stator plate 70 of the magnetic resolver. In the constituent gripping step, the base plate 71 composing the stator plate 70 is gripped. The stator plate 70 is gripped by the collet chuck 74, which is the grip unit mounted on the movable plate 77.

A description is now given of a specific operation of gripping the base plate 71. As shown in FIG. 7, the chuck body 76 is moved in the reverse direction (a rightward direction in FIG. 7) by pushing the operation member 75a disposed at the proximal end side of the collet chuck 74. Accordingly, the interval between the distal ends of the segments of the chuck body 76, which are separated by the slits 76b, increases. In this state, the base plate 71 is housed in the recess 76d formed at the distal ends of the segments of the chuck body 76. At this time, the circumferential position of the base plate 71 is set by inserting the projection 76e formed on the circumferential wall of the recess 76d into the recess 71a of the base plate 71 (FIG. 6). Thereafter, the operation of the operation member 75a is stopped.

Once the operation of the operation member 75a has been stopped, the non-illustrated chuck spring, which is housed in the tube member 75, applies a force to the chuck body 76 so as to move the chuck body 76 in the axial direction relative to the tube member 75. Accordingly, the interval between the distal ends of the segments of the chuck body 76, which are separated by the slits 76b, is reduced. Thus, the chuck body 76 grips the circumference of the base plate 71 housed in the recess 76d formed at the distal end of the chuck body 76. The base plate 71 is gripped in a state where it shares the same central axis with the collet chuck 74.

<Connected Coil Assembly Forming Step>

In the connected coil assembly forming step, the connected coil assembly 9, which is composed of the plurality of single coils 9a connected to one another, is formed. The connected coil assembly 9 is formed by the connected coil assembly forming unit 10. Specific procedures of this step will now be described.

Figure 8A:
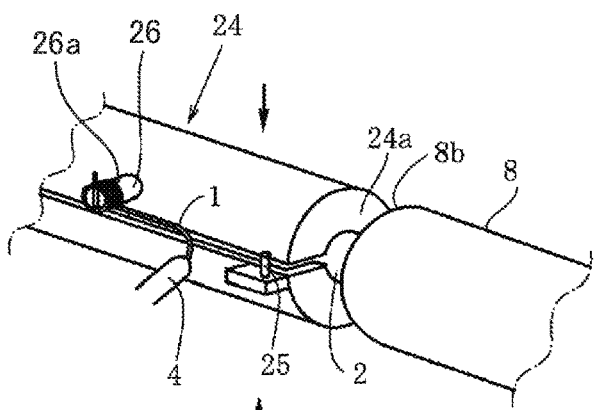
FIG. 8A shows a procedure of a winding operation performed by the connected coil assembly forming unit.

First, while the chuck 24 is in the opened state due to the advanced central bar 35, the chuck 24 is advanced to surround the winding shaft 2. Thereafter, the chuck 24 is closed as shown in FIG. 8A by causing the central bar 35 to recede. The end surface 24a of the chuck 24 and the end surface 8b of the tube member 8 form flanges that define a region in which the wire 1 is to be wound on the winding shaft 2. That is, the end surface 24a and the end surface 8b define the winding width of the wire 1 to be wound onto the winding shaft 2. The interval between the end surface 24a and the end surface 8b is equivalent to the winding width of the single coils 9a.

Figure 8B:
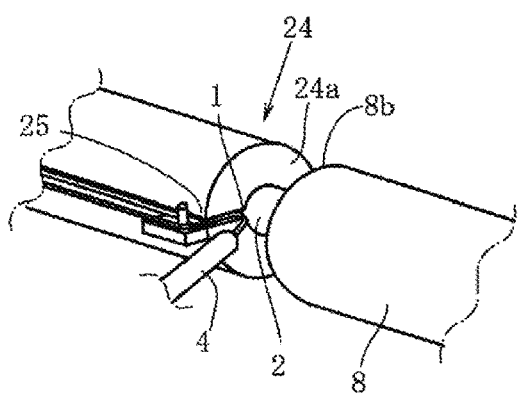
FIG. 8B shows a procedure of the winding operation performed by the connected coil assembly forming unit.

Next, while the wire 1 is being held by driving the clamp cylinder 61, the nozzle 4 is moved. As shown in FIG. 8A, the wire 1 fed from a tip of the nozzle 4 latches to the cutout 26a formed in the tip of the holding tool 26. Thereafter, the clamp cylinder 61 releases the wire 1, and the nozzle 4 is moved. As shown in FIG. 8B, while the wire 1 is being fed by the nozzle 4, the wire 1 is guided to a winding start position in the vicinity of the end surface 24a of the chuck 24, and latches to the latch pin 25.

Figure 8C:
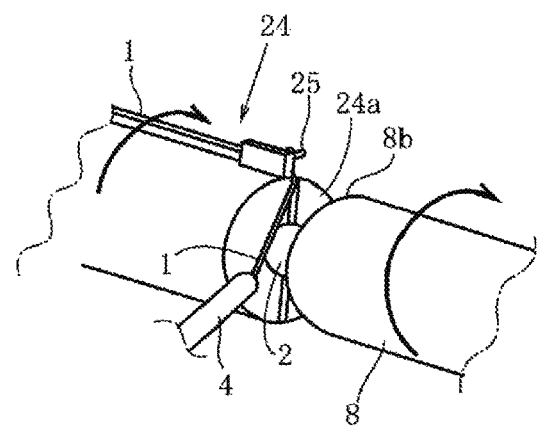
FIG. 8C shows a procedure of the winding operation performed by the connected coil assembly forming unit.

In this state, the chuck 24 and the winding shaft 2 are rotated in synchronization as shown in FIG. 8C. At this time, the wire 1 fed by the nozzle 4 is guided to the winding shaft 2 between the end surface 24a and the end surface 8b.

Figure 8D:
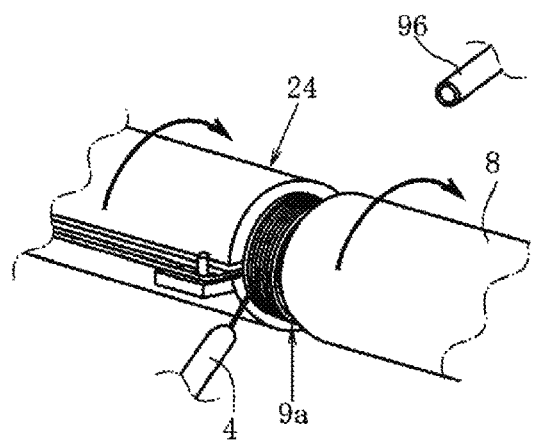
FIG. 8D shows a procedure of the winding operation performed by the connected coil assembly forming unit.

Thereafter, while the chuck 24 and the winding shaft 2 are being continuously rotated in synchronization, the nozzle 4 reciprocates in parallel to the winding shaft 2 between the end surface 24a and the end surface 8b as shown in FIG. 8D. The wire 1 is wound in multiple layers onto the winding shaft 2 between the end surface 24a and the end surface 8b. As a result, one single coil 9a composing the connected coil assembly 9 is formed on the winding shaft 2.

During winding of the wire 1, the hot air device 96 blows hot air to the wire 1 wound onto the winding shaft 2. Therefore, a self-welding layer on the surface of the wire 1 is melted. The entirety of the wire 1 that has been wound to constitute the single coil 9a is welded, thereby maintaining the shape of the single coil 9a.

In the foregoing description, during winding of the wire 1 onto the winding shaft 2, the chuck 24 is rotated by rotating the chuck shaft 23. The wire 1 can be wound onto the winding shaft 2 without rotating the chuck shaft 23, because at the start of winding, the winding shaft 2 is rotated in a state where the wire 1 has been guided to the outer circumference of the winding shaft 2.

Figure 8E:
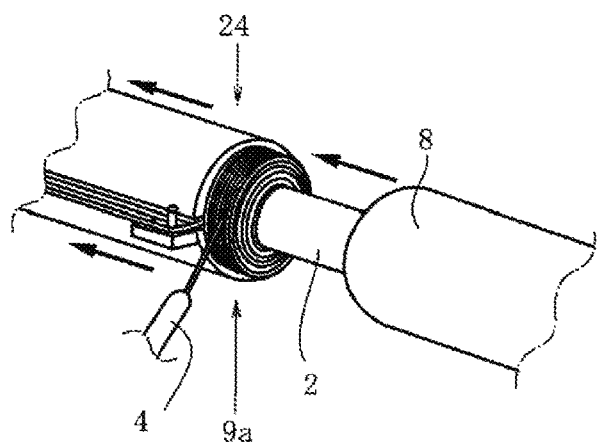
FIG. 8E shows a procedure of the winding operation performed by the connected coil assembly forming unit.

After the completion of winding of the single coil 9a, the chuck 24 and the winding shaft 2 are moved away from the tube member 8 by a predetermined distance as shown in FIG. 8E. This predetermined distance is equivalent to a sum of spacing between neighboring single coils 9a and the winding width of a single coil 9a to be wound next.

Figure 8F:
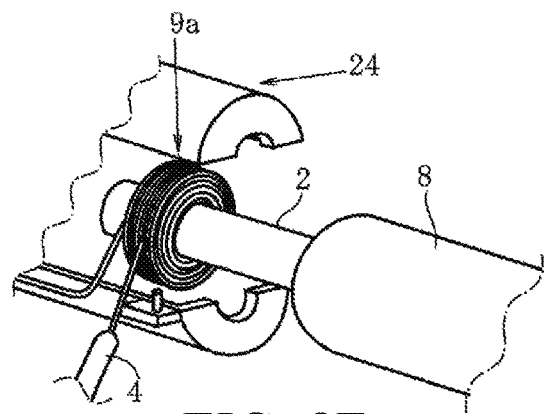
FIG. 8F shows a procedure of the winding operation performed by the connected coil assembly forming unit.

Then, as shown in FIG. 8F, the chuck 24 is opened and moved toward the winding shaft 2. Thereafter, the chuck 24 is closed again. Accordingly, the previously-formed single coil 9a is stowed in the chuck 24, and a region in which the wire 1 is to be wound next is defined on the winding shaft 2 (the same as the state shown in FIG. 8B).

The formed single coil 9a may be stowed in the chuck 24 by opening the chuck 24 upon completion of winding of the formed single coil 9a, moving the winding shaft 2 by the predetermined distance, and then closing the chuck 24, rather than by causing the chuck 24 to recede and advance.

Next, similarly to the state shown in FIG. 8B, the wire 1 is hooked around the latch pin 25, and moved to a winding start position for the single coil 9a to be wound next. As a connecting wire portion 9b (FIG. 12) between neighboring single coils 9a is hooked around the latch pin 25, the single coil 9a that has already been formed and stowed in the chuck 24 is unlikely to be subjected to tension of the wire 1 during winding of the next single coil 9a. This can prevent an end portion of the single coil 9a that has already been formed from getting unwound.

Subsequent procedures are the same as the procedures shown in FIGS. 8C to 8F. By repeating these procedures as many times as a desired number of single coils 9a to compose the connected coil assembly 9, the plurality of single coils 9a are wound onto the winding shaft 2 in series as shown in FIG. 9 (the connected coil assembly 9 is composed of eight single coils 9a in FIG. 9).

When winding has been completed, the chuck 24 opens and recedes. The clamp cylinder 61 is driven to hold the wire 1, and the non-illustrated cutter device cuts the wire 1 between a single coil 9a that was formed last and the nozzle 4.

As described above, the connected coil assembly forming unit 10 winds and forms the connected coil assembly 9 composed of the plurality of single coils 9a that are connected to one another in series on the winding shaft 2. That is, the connected coil assembly forming unit 10 forms the connected coil assembly 9 by repeating the following operations of forming the single coils 9a: winding the wire 1 onto the winding shaft 2 between the chuck 24 and the tube member 8, moving the winding shaft 2 relative to the chuck 24 and the tube member 8, and winding the wire 1 onto the winding shaft 2 between the chuck 24 and the tube member 8 again. The chuck 24 and the tube member 8 serve as the winding width defining members.

<Coil Mounting Step>

In the coil mounting step, at least one of the single coils 9a of the connected coil assembly 9 is mounted on the base plate 71 using a projection(s) 72 as a central shaft(s). That is, in the coil mounting step, the single coils 9a (in a wound state) of the connected coil assembly 9 is sequentially mounted on the plurality of projections 72 formed on the base plate (the constituent of the electronic component) 71 while moving the base plate 71 relative to the connected coil assembly 9.

Specifically, in place of the chuck 24 that has receded, the movable plate 77 and the collet chuck 74 rotatably supported by the movable plate 77 are moved by the chuck moving mechanism 86 so as to guide the base plate 71 gripped by the collet chuck 74 to a distal end of the winding shaft 2. The collet chuck 74 and the stator plate 70 gripped by the collet chuck 74 are rotated by driving the servomotor (rotating mechanism) 81 for rotating the collet chuck 74. This causes one of the plurality of projections 72 formed on the base plate 71 to oppose the edge of the distal end of the winding shaft 2 as shown in FIG. 9. One of the plurality of projections 72 mentioned here is a projection 72 on which a single coil 9a is to be mounted.

Thereafter, the bidirectional cylinder 93 (FIG. 1) brings the coil latch 91 into proximity with the winding shaft 2. Accordingly, as shown in FIG. 10, the winding shaft 2 inserted through the formed connected coil assembly 9 is housed in the housing grooves 91a, and each pawl 91c is inserted between neighboring single coils 9a.

The axial movement actuator 94 (FIG. 1) moves the coil latch 91 in the axial direction of the winding shaft 2 toward the distal end of the winding shaft 2. As the pawls 91c restrict the movement of the connected coil assembly 9 relative to the coil latch 91, the first single coil 9a of the connected coil assembly 9 is demounted from the winding shaft 2 as shown in FIG. 11. This first single coil 9a is located closest to the distal end of the winding shaft 2 among the plurality of single coils 9a. The demounted first single coil 9a is immediately mounted on the projection 72 that opposes the distal end of the winding shaft 2.

In the coil mounting step, the plurality of single coils 9a (in a wound state) of connected coil assembly 9 is sequentially mounted on the plurality of projections 72 formed on the base plate 71. After one single coil 9a is mounted on one projection 72, the stator plate 70 is rotated together with the collet chuck 74 again by driving the servomotor 81 (rotating mechanism, FIG. 1). This causes another projection 72 that is included among the plurality of projections 72 formed on the base plate 71 and that neighbors the projection 72 on which the single coil 9a has already been mounted to newly oppose the edge of the distal end of the winding shaft 2 as shown in FIG. 12.

The bidirectional cylinder 93 moves the coil latch 91 away from the winding shaft 2. That is, the winding shaft 2 inserted through the formed connected coil assembly 9 is withdrawn from the housing grooves 91a, and each pawl 91c is moved away from spacing between neighboring single coils 9a. Thereafter, the axial movement actuator 94 moves the coil latch 91 in the axial direction of the winding shaft 2 toward a proximal end of the winding shaft 2 by a pitch of the plurality of single coils 9a. Then, the bidirectional cylinder 93 brings the coil latch 91 into proximity with the winding shaft 2 again. Accordingly, the winding shaft 2 inserted through the formed connected coil assembly 9 is housed in the housing grooves 91a, and each pawl 91c is inserted between neighboring single coils 9a again.

Figure 12:
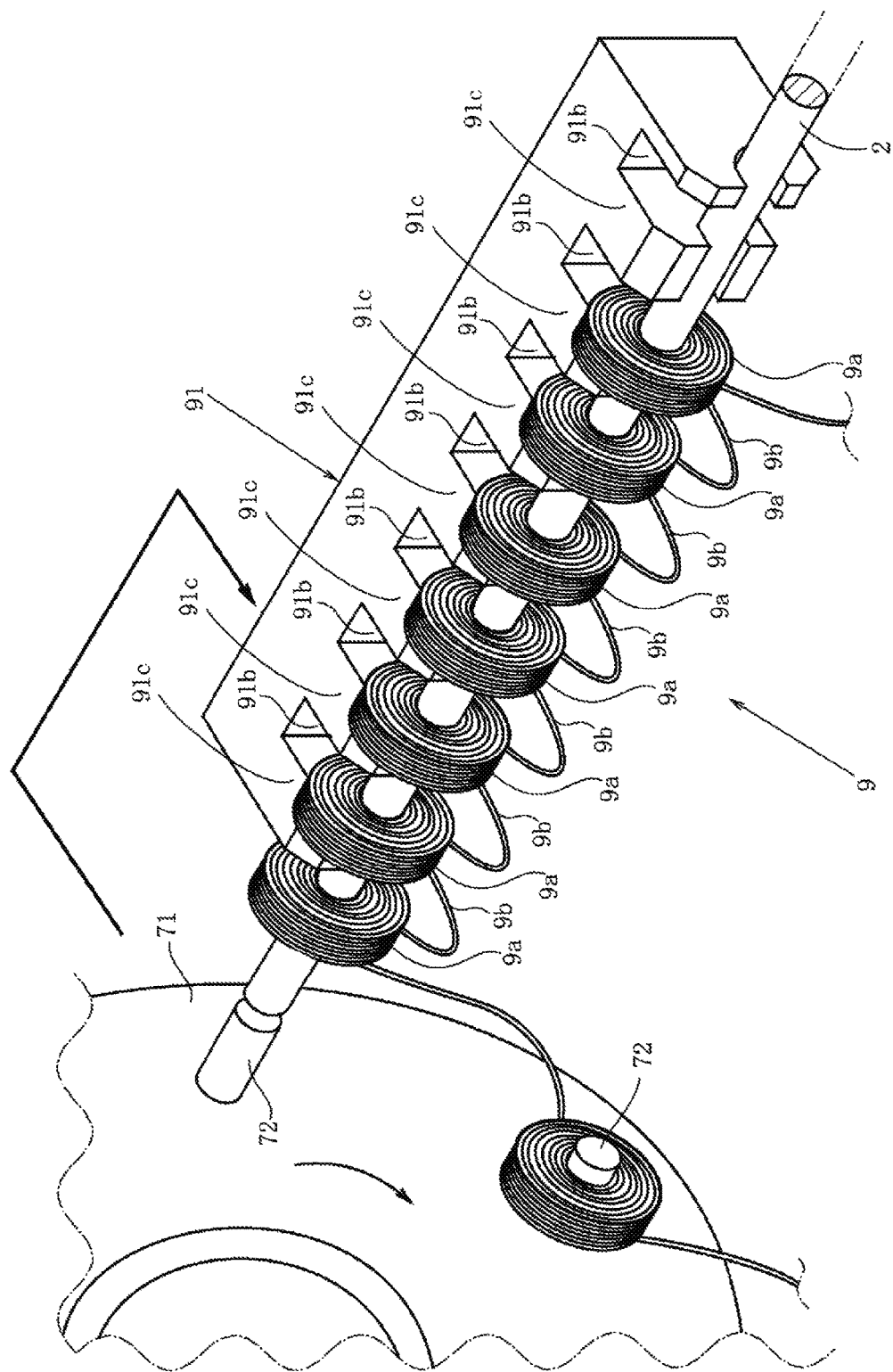
FIG. 12 is a perspective view corresponding to FIG. 10, and shows a state where a single coil is to be mounted on another projection by rotating the stator plate.

This places the second single coil 9a of the connected coil assembly 9 at the distal end of the winding shaft 2 as shown in FIG. 12. Among the plurality of single coils 9a composing the connected coil assembly 9, this second single coil 9a immediately succeeds the first single coil 9a that has been mounted on the corresponding projection 72. The winding shaft 2 inserted through the singe coils 9a remaining on the winding shaft 2 is housed in the housing grooves 91a of the coil latch 91, and each pawl 91c is inserted between neighboring single coils 9a remaining on the winding shaft 2.

The axial movement actuator 94 moves the coil latch 91 toward the distal end of the winding shaft 2 again. As the pawls 91c restrict the movement of the connected coil assembly 9 relative to the coil latch 91, the second single coil 9a of the connected coil assembly 9 is demounted from the winding shaft 2. The demounted second single coil 9a is mounted on another projection 72 that opposes the distal end of the winding shaft 2.

By repeating the foregoing operations as many times as the number of single coils 9a, all of the single coils 9a composing the connected coil assembly 9 are sequentially mounted on the plurality of projections 72 formed on the base plate 71. The coil mounting step is completed when all of the single coils 9a have been mounted on all of the plurality of projections 72.

The completion of the coil mounting step marks the completion of fitting of the connected coil assembly 9, which has been obtained through the connected coil assembly forming step, around the plurality of projections 72 formed on the base plate 71. The base plate 71, together with the connected coil assembly 9 fit around the projections 72, constitute the stator plate 70. The stator plate 70 thus configured is removed from the collet chuck 74 for use in the next step by pressing the operation member 75a disposed at the proximal end side of the collet chuck 74.

The apparatus 100 and the method for manufacturing the electronic component according to the present invention allow the obtained connected coil assembly 9 to be fit directly around the projections (receiving portions) 72. Therefore, variations in products can be eliminated compared with a case in which the connected coil assembly 9 is fit around the projections 72 through manual labor. In other words, by fitting the obtained connected coil assembly 9 directly around the receiving portions, the electronic component including the connected coil assembly 9 can be manufactured in a relatively easy manner, and a rise in the unit price of an obtained product can be prevented.

In the foregoing embodiment, the electronic component is the magnetic resolver, and the constituent of the electronic component is the stator plate 70 of the magnetic resolver. The electronic component is not limited to the magnetic resolver. The present invention is applicable to an apparatus and a method for manufacturing an electronic component that includes the plurality of projections 72 as the receiving portions for the single coils 9a.

The electronic member is not limited to the disc-shaped or annular base plate 71 made of a magnetic material. When the electronic member is the disc-shaped or annular base plate 71 made of a magnetic material and the plurality of projections 72 are circumferentially arranged on one surface of the base plate 71, it is preferable to sequentially mount the single coils 9a on the plurality of projections 72 while rotating or moving at least one of the grip unit 74 that grips the base plate 71, the connected coil assembly forming unit 10, and the coil mounting unit 91, 92.

In this case, it is preferable that the apparatus 100 for manufacturing the electronic component includes the rotating mechanism 81 that rotates the base plate 71 and stops the rotated base plate 71 at positions of mounting of the single coils 9a. It is preferable that the connected coil assembly forming unit 10 includes the winding shaft 2 that is rotatable about its axis and movable in its axial direction, the wire supply unit 4 that feeds the wire 1 toward the winding shaft 2 and is movable in the axial direction of the winding shaft, and the chuck 24 that defines an end surface of each single coil 9a during winding of the wire 1 and allows the winding shaft 2 to be inserted thereinto after formation of each single coil 9a constituted by the wound wire 1. It is also preferable to wind the plurality of single coils 9a onto the winding shaft 2 in series by sequentially stowing the single coils 9a formed on the winding shaft 2 in the chuck 24.

With the apparatus 100 and the method for manufacturing the electronic component according to the present embodiment, the coil mounting unit 91, 92 provided separately from the connected coil assembly forming unit 10 sequentially mounts the plurality of single coils 9a composing the connected coil assembly 9 on the plurality of projections 72. The connected coil assembly 9 obtained by the connected coil assembly forming unit 10 is fit directly around the receiving portions. Thus, the electronic component including the connected coil assembly 9 can be manufactured in a relatively easy manner.

Embodiments of this invention were described above, but the above embodiments are merely examples of applications of this invention, and the technical scope of this invention is not limited to the specific constitutions of the above embodiments.

This application claims priority based on Japanese Patent Application No. 2015-103352 filed with the Japan Patent Office on May 21, 2015, the entire contents of which are incorporated into this specification.

The invention claimed is:

1. An apparatus for manufacturing an electronic component, the apparatus comprising:
   a grip unit configured to grip an electronic member having a plurality of projections arranged thereon;
   a connected coil assembly forming unit configured to form a connected coil assembly in which a plurality of single coils are connected to one another; and
   a coil mounting unit configured to sequentially mount the plurality of single coils of the connected coil assembly on the plurality of projections.

2. The apparatus for manufacturing the electronic component according to claim 1, wherein
   the electronic member comprises a disc-shaped or annular base plate made of a magnetic material,
   the plurality of projections are circumferentially arranged on one surface of the base plate, and
   the single coils are sequentially mounted on the plurality of projections while rotating or moving at least one of the grip unit configured to grip the base plate, the connected coil assembly forming unit, and the coil mounting unit.

3. The apparatus for manufacturing the electronic component according to claim 2, further comprising a rotating unit configured to rotate the base plate, wherein
   the rotating unit is configured to stop the rotated base plate at positions of mounting of the single coils.

4. The apparatus for manufacturing the electronic component according to claim 1, wherein:
   the connected coil assembly forming unit includes:
      a winding shaft rotatable about an axis thereof, and movable in an axial direction thereof;
      a wire supply unit configured to feed a wire toward the winding shaft, the wire supply unit being configured to move in the axial direction of the winding shaft; and
      a chuck configured to define an end surface of each single coil during winding of the wire, and to allow the winding shaft to be inserted thereinto after formation of each single coil constituted by the wound wire; and
   the plurality of single coils are wound onto the winding shaft in series by sequentially stowing the single coils formed on the winding shaft in the chuck.

5. A method for manufacturing an electronic component, the method comprising:
   preparing and gripping a base plate having a plurality of projections arranged thereon;
   forming a connected coil assembly in which a plurality of single coils are connected to one another; and
   mounting the connected coil assembly on the base plate,
   wherein the method comprises, in mounting the connected coil assembly, sequentially mounting the plurality of single coils of the connected coil assembly on the plurality of projections while moving the base plate relative to the connected coil assembly.

* * * * *